Nov. 28, 1944.   A. FISHER   2,363,856
REGULATING CIRCUIT
Filed Dec. 30, 1941
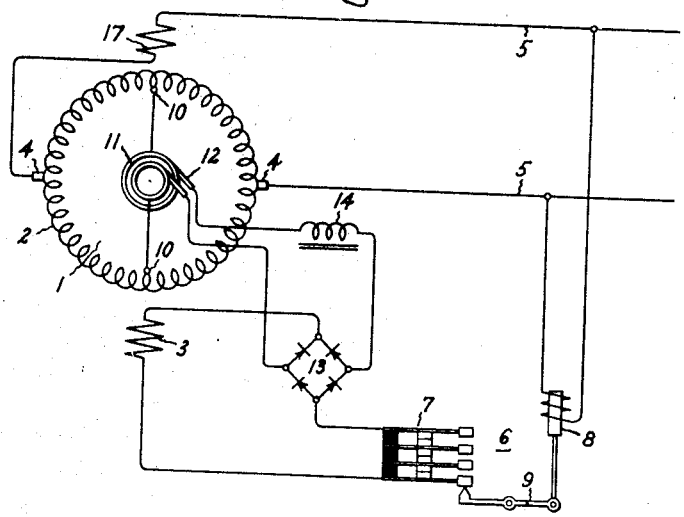
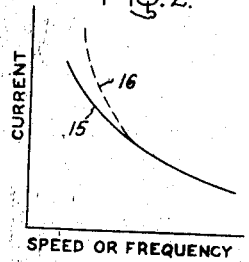
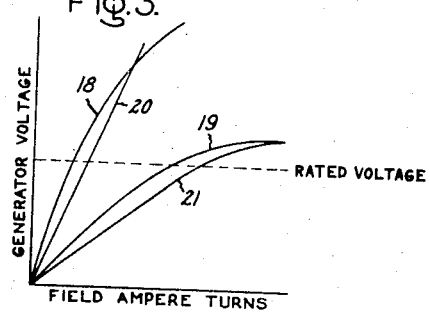
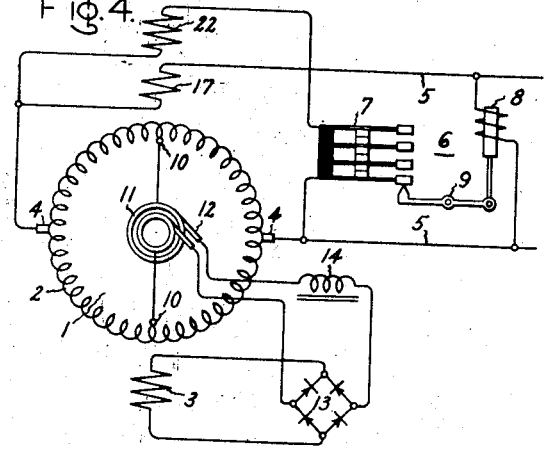
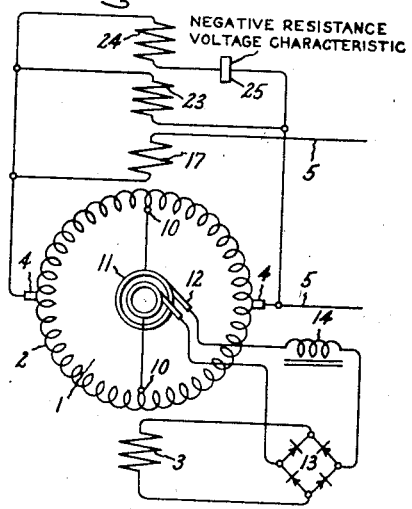
Inventor:
Alec Fisher,
by Harry E. Dunham
His Attorney.

Patented Nov. 28, 1944

2,363,856

UNITED STATES PATENT OFFICE 2,363,856

REGULATING CIRCUIT

Alec Fisher, Lynn, Mass., assignor to General Electric Company, a corporation of New York Application December 30, 1941, Serial No. 424,914

4 Claims. (Cl. 171—119)

This invention relates to automatic regulating circuits for dynamo-electric machines and more particularly to an improved automatic voltage regulating circuit for self-excited dynamo-electric generators.

It is well known that the voltage of a dynamo-electric generator is proportional to its speed and its exciting flux. If saturation is neglected the exciting flux of a self-excited generator is also proportional to its voltage and therefore the voltage of such machine is in general proportional to the square of its speed. Saturation, of course, modifies this relation somewhat but nevertheless if the generator is driven over a wide range of speed an automatic voltage regulator for the generator has to have an abnormally wide range of control in order to maintain the voltage constant.

In accordance with this invention there is provided a novel and simple arrangement for greatly reducing the duty imposed on an automatic voltage regulator for this service whereby it is possible to use a conventional or standard rheostatic regulator of the type which is adapted for service with constant speed generators. This arrangement is characterized by obtaining some of the exciting ampere turns of the generator from an alternating voltage derived from the regulated generator and whose frequency is proportional to the speed of the generator in combination with a series reactor. The reactance of the reactor, being proportional to the frequency, can be made to change the exciting ampere turns which it controls in inverse relation to the speed or frequency of the regulated machine at constant voltage. In this manner the regulator is relieved a substantial part of its burden.

An object of the invention is to provide a new and improved automatic regulator circuit.

Another object of the invention is to provide an improved automatic voltage regulating circuit for variable speed dynamo-electric machines.

A further object of the invention is to provide a rugged, simple and inexpensive circuit arrangement for reducing the duty on an automatic voltage regulator for a variable speed generator.

The invention will be better understood from the following description taken in connection with the accompanying drawing and its scope will be pointed out in the appended claims.

In the drawing Fig. 1 illustrates diagrammatically a preferred embodiment of the invention. Fig. 2 illustrates the characteristic curves of the reactor circuit employed in the invention, Fig. 3 illustrates the high and low speed saturation and resistance or impedance characteristics of the generator of Fig. 1, Fig. 4 is a modification in which the regulating machine is provided with separate shunt field windings, and Fig. 5 is a further modification utilizing a different form of automatic voltage responsive voltage regulation.

Referring now to the drawing and more particularly to Fig. 1, there is shown therein a generator having a rotor 1, an armature winding 2 and a field winding 3. These parts are shown by way of example as combined in the form of a conventional direct-current generator in which the armature winding 2 is carried and revolves with the rotor 1, although this of course is not essential. The armature winding is provided with a conventional commutator (not shown) on which ride brushes 4 across which a unidirectional potential may be obtained for exciting an external circuit 5.

The field winding 3 is a shunt field winding, the current in which is controlled primarily by means of an automatic generator voltage regulator 6 of any suitable type. It is shown by way of example as a direct-acting rheostatic regulator, a number of suitable forms of which are described and claimed in Patent No. 2,136,257, granted November 8, 1938, on an application of Louis W. Thompson and assigned to the assignee of the present application. This regulator consists essentially of a rheostatic element 7 connected in series with the field winding 3 and an electromagnetic operator torque motor 8 connected thereto by means of a suitable operating linkage 9. The rheostatic element may be of any suitable type, such as a series of carbon plates separated by metal inserts caused to provide a relatively high contact resistance of alternately different material. The carbon plates carry at one end silver contact buttons so that variations in positions of the operator which are transmitted by means of the linkage 9 will progressively tilt or pivot the carbon plates about the metal inserts and cause successive short circuiting of the contact resistances by means of the direct engagement of the silver contact buttons. The winding of the electromagnetic operator is connected to respond to the voltage of the generator, such as by connecting it across the circuit 5.

The arrangement is such that if the generator voltage increases, the resistance of the rheostat 7 is increased thereby to decrease the field current and hence the generator voltage. Similarly, a decrease in generator voltage will cause the rheostat to decrease its resistance thereby to increase the field current and return the voltage to normal.

The circuit of the field winding 3 differs, however, from a conventional direct-current generator shunt field circuit in that it is not connected across the load brushes or main output circuit. Its energization is obtained from a pair of taps 10 in the armature winding which are connected respectively to slip rings 11 so that across these slip rings there exists an alternating potential whose frequency is proportional to the speed of the generator. These collector rings are connected by means of brushes 12 to the input terminals of a rectifier 13 whose output terminals are connected to the field winding. In order automatically to vary the current in the field winding 3 in accordance with changes in speed of the generator and independently of the action of the regulator 6 there is provided a reactor 14 connected in series with the input terminals of the rectifier.

The operation of Fig. 1 can best be understood by reference to Fig. 2 wherein the solid curve 15 illustrates the relation between current through the reactor 14 and speed or frequency of the generator under conditions of constant magnitude of generator voltage. As will be seen, this is an inverse relationship in which the current is high at low speed and decreases to a minimum value at maximum speed or frequency. It is not a straight line because of the presence of resistance in the reactor circuit. The dashed curve 16 shows how this relationship is modified if the reactor 14 is provided with a core which saturates at the higher values of current. Such an effect is preferable as it can be made to approach the characteristic saturation curve of a generator except that it is an inverse saturation characteristic which is what is desired for best regulation. As a consequence of this characteristic changes in current in the field winding 3 due to the presence of the reactor 14 are alone almost sufficient to provide constant generator voltage with the result that the regulator 6 need only control the marginal amount of current necessary to provide 100 per cent or substantially flat regulation.

The regulator duty may be further reduced with changes in load on the generator by means of a series winding 17 connected in the output circuit 5.

In Fig. 3 the curve 18 is the high speed saturation curve of the generator and the curve 19 is the low speed saturation curve of the generator, while lines 20 and 21 are the field resistance or more properly impedance lines at high and low speed respectively. These characteristics or lines are plotted in terms of generator voltage vs. field ampere turns and it will be noted that the field impedance lines shift with changes in speed so as to maintain substantially the same relationship to the saturation curves at the corresponding speeds with the result that the amount or field or automatic regulator resistance necessary to establish rated voltage at any speed remains substantially constant.

In Fig. 4 an additional shunt field winding 22 is provided which is connected as a conventional shunt field winding across the direct-current output circuit of the generator. The rheostatic element 7 of the regulator is connected in series with this field winding. In this manner the field winding 22 provides the marginal amount of ampere turns necessary to provide final voltage regulation and the field winding 3, together with the rectifier 12 and reactor 14 provides the basic regulation and reduces to a minimum the duty or burden on the regulator 6 and the field winding 22. The operation of this figure is otherwise the same as that of Fig. 1.

In Fig. 5 the direct-acting rheostatic regulator is replaced by a static non-linear regulator circuit comprising a boosting shunt field winding 23 and a bucking shunt field winding 24. Connected in series with the bucking field winding 24 is a non-linear impedance element, such for example as an instantaneously acting negative resistance voltage characteristic resistor 25. A suitable material for such a resistor is described and claimed in Patent No. 1,822,742, granted September 8, 1931, on an application of Karl B. McEachron and assigned to the assignee of the present application. This material has the property of reducing its resistance instantaneously with increases in voltage thereacross, the relationship being defined more accurately by the equation $RI^a=C$ where R is its instantaneous resistance in ohms, I is the current through it in amperes, $a$ is an exponent whose value is determined by the controls used in the manufacture of the resistance material and C is a constant whose value is determined by the physical dimensions of the particular resistor.

In the operation of Fig. 5 the bucking and boosting field circuits are so correlated that at normal voltage the difference between their ampere turns when added to the ampere turns of the field winding 3 is just sufficient to maintain normal generator voltage. If now the voltage rises above normal there will be a rapid and disproportionate increase in current through the negative resistance voltage characteristic resistor 25 thereby reducing the no ampere turns of excitation of the generator and reducing its voltage. Similarly, a decrease in generator voltage below normal will cause a rapid and disproportionate decrease in the bucking field winding 24 thereby producing a relatively large and quick increase in ampere turns of the regulated generator and thus raising its voltage.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a variable speed dynamo-electric generator having a rotor, an armature winding and an effectively shunt connected field winding, said armature winding having induced therein an alternating voltage whose frequency is proportional to the speed of said rotor and whose magnitude is proportional to the flux produced by said field winding, and a reactor connected in series circuit relation with said field winding, said generator having a magnetic circuit with a predetermined armature voltage vs. field current saturation characteristic, said reactor producing a field current vs. frequency characteristic by reason of self-saturation of its magnetic circuit which is substantially the inverse of said saturation characteristic.

2. In combination, a variable speed dynamo-electric generator having a rotor, an armature winding and an effectively shunt connected field winding, said armature winding having induced therein an alternating voltage whose frequency is proportional to the speed of said rotor and whose magnitude is proportional to the flux produced by said field winding, a reactor connected in series circuit relation with said field winding, and armature winding voltage responsive direct-acting rheostatic voltage regulating means for the field flux of said generator.

3. In combination, a variable speed dynamo-electric generator having a rotor, an armature winding and an effectively shunt connected field winding, said armature winding having induced therein an alternating voltage whose frequency is proportional to the speed of said rotor and whose magnitude is proportional to the flux produced by said field winding, a reactor connected in series circuit relation with said field winding, and direct-acting armature winding voltage responsive rheostatic regulating means for the current in said field winding.

4. In combination, a variable speed dynamo-electric generator having a rotor, an armature winding and an effectively shunt connected field winding, said armature winding having induced therein an alternating voltage whose frequency is proportional to the speed of said rotor and whose magnitude is proportional to the flux produced by said field winding, a reactor connected in series circuit relation with said field winding, an additional cumulatively-acting shunt field winding for said generator, and direct-acting armature winding voltage responsive rheostatic voltage regulating means for controlling the current in said additional field winding.

ALEC FISHER.